United States Patent [19]
Cheney

[11] Patent Number: 5,299,722
[45] Date of Patent: Apr. 5, 1994

[54] DOUBLE LID TRUCK STORAGE BOX

[76] Inventor: Dale S. Cheney, 2679 W. 1700 South, Syracuse, Utah 84075

[21] Appl. No.: 7,274

[22] Filed: Jan. 21, 1993

[51] Int. Cl.$^5$ ............................................. B60R 9/00
[52] U.S. Cl. ................................. 224/273; 224/282; 224/42.42; 206/317; 220/335; 220/342; 296/37.6
[58] Field of Search ............... 224/273, 912, 913, 309, 224/315, 42.42, 42.43, 282, 275, 277, 279; 296/37.6, 37.1; 206/317; 220/521, 522, 335, 342, 343

[56] References Cited

U.S. PATENT DOCUMENTS

| | | | |
|---|---|---|---|
| 750,817 | 2/1904 | Crenshaw | 206/317 |
| 784,601 | 3/1905 | Taylor | 206/317 |
| 2,501,270 | 3/1950 | Fleming | 206/571 |
| 3,165,225 | 1/1965 | Reitzel | 220/343 X |
| 3,777,882 | 12/1973 | McIntyre | 206/370 |
| 3,926,308 | 12/1975 | Sullivan | 206/223 |
| 4,136,904 | 1/1979 | Lauderdale | 296/37.1 |
| 4,524,496 | 6/1985 | Tehsildar et al. | 220/335 X |
| 4,531,774 | 7/1985 | Whatley | 296/37.6 |
| 4,697,379 | 10/1987 | McPhaul | 43/54.1 |
| 4,809,897 | 3/1989 | Wright, Jr. | 224/282 |
| 4,878,706 | 11/1989 | Novikov | 296/37.1 |
| 4,928,865 | 5/1990 | Lorence et al. | 224/277 X |
| 4,936,624 | 6/1990 | West | 224/282 X |
| 4,967,944 | 11/1990 | Waters | 224/273 |
| 5,004,103 | 4/1991 | Connors et al. | 206/372 |
| 5,080,250 | 1/1992 | Dickinson et al. | 224/273 X |
| 5,088,636 | 2/1992 | Barajas | 224/315 X |

FOREIGN PATENT DOCUMENTS

| | | | |
|---|---|---|---|
| 59036 | 5/1980 | Japan | 224/282 |
| 4-328045 | 11/1992 | Japan | 224/273 |
| 9002061 | 3/1990 | PCT Int'l Appl. | 224/277 |

*Primary Examiner*—Glenn T. Barrett
*Attorney, Agent, or Firm*—M. Reid Russell

[57] ABSTRACT

A double lid truck storage box that includes a rectangular box arranged for mounting in a standard pickup truck bed to extend thereacross and includes a double lid for closing thereover. The rectangular box and double lid are preferably formed of steel, or like material, and include a top lid that is hinge connected along a rear wall lower edge to a lower lid rear wall upper edge, and which lower lid rear wall lower edge, is hinge connected to an upper edge of the rectangular box rear wall, such that the respective hinges are aligned vertically with one another to allow for individual opening of the top lid off of the lower lid and the lower lid off of the rectangular box. The double lid provides, from the rectangular box rear wall, for clearance as from a pickup truck cab and bed forward wall as the double lid is lifted. The top lid and lower lid of the double lid can be individually locked over the lower lid and to the rectangular box, respectively, and the interior area between the upper and lower lid is arranged to accommodate items, such as guns, tools or the like, therein, with tools, hunting and fishing gear, or the like, maintained in the rectangular box.

11 Claims, 3 Drawing Sheets

DOUBLE LID TRUCK STORAGE BOX

BACKGROUND OF THE INVENTION

1. Field of the Invention

The invention relates to utility containers, that are preferably metallic, for providing a secured storage of items, such as tools, and arranged for mounting into the bed of a standard pickup truck.

2. Prior Art

Similar to the invention a number of earlier container and box arrangements have been devised for mounting in and to a pickup truck bed. For example, U.S. Pat. to Whatley, No. 4,531,774; to West, No. 4,936,624; and to Waters, No. 4,967,944, all show pickup truck mounted boxes and mounting structures that have elements in common with the present invention. Specifically, like the invention, each includes a box with a hinged lid structure and provides for mounting to a pickup truck bed, juxtaposition to the truck cab. Further, the Waters, '944 patent, also includes a removable tray that is exposed by lifting the box lid around its hinge coupling, and the West '624 patent provides an arrangement of tool trays that rise as the lid is opened. None of which earlier patents, however, show a double lid arrangement like that of the invention that includes separate hinges and locks for a top lid and lid, respectively, where the lid itself is a container for receiving items, such as guns, stored therein.

Containers or boxes for mounting and/or transport in a motor vehicle are shown in U.S. Pat. to Lauderdale, No. 4,136,904 and to Novikov, No. 4,878,706, that, like the above cited patents, are boxes with lids and locks, and further include compartments, with the Lauderdale '904, also providing a mounting arrangement. Neither of which patents, however, shows a double lid structure like that of the invention. Containers or boxes having one or more tray structures fitted and/or stacked therein are shown in a number of earlier U.S. Pat. to Crenshaw, No. 750,817; to Taylor, No. 784,601; to Fleming, No. 2,501,270; to McIntyre, No. 3,777,882; to McPhaul, No. 4,697,379; and to Connors, et al, No. 5,004,103; and a hinged tray is shown in a U.S. Pat. to Sullivan, No. 3,926,308. None of which patents show a double lid arrangement for both covering over a container or box that is like that of the invention, for providing a separate storage capability.

Finally, an accordion hinged top lid, lid, and container arranged as a console storage receptacle is shown in a U.S. Pat. to Wright, Jr., No. 4,809,897. Which storage receptacle top lid and lid connected along one edge with the lid hinged to the container along the lid opposite edge, and, of course, the top lid and lid are not separately lockable or even lockable. Also, the console storage receptacle of Wright '897 is structurally different from the invention as it is for arrangement between vehicle seats rather than in a pickup truck bed.

SUMMARY OF THE INVENTION

It is a principal object of the present invention in a double lid truck storage box to provide an arrangement of a double lid for a pickup truck mounted storage box where a top lid of that double lid is hinge connected to a lower lid of that double lid, which lower lid is separately hinge connected to a storage box edge, the hinges juxtaposition to one another, with the top lid for opening to expose a storage area in which lower lid.

Another object of the present invention is to provide the lower lid with an open area below which top lid that has a depth for accommodating flat items, such as guns or tools, and includes a capability for separately locking which top lid in covering arrangement over which lower lid.

Another object of the present invention is to provide a locking capability to the lower lid in its covering engagement over the storage box, and to provide a lid hinge arrangement where the lower lid is shifted towards the storage box forward wall as it is lifted.

Still another object of the present invention is to provide a truck storage box with a double lid that has the appearance of a conventional truck storage box so as not to call attention to the double lid storage capabilities.

The double lid truck storage box of the invention consists of a rectangular box of a length to fit between the side walls of a conventional pickup truck bed. The box is arranged to be mounted in pickup truck bed forward end, adjacent to the truck cab, utilizing bolt type fasteners, or the like, that are fitted through the box bottom and pickup truck bed, and the box may include wing sections that extend across the pickup truck side walls. The box may have an open interior or include rails for supporting a tray or trays, and can be utilized to hold tools, food, fishing or hunting supplies, or the like.

The double lid is for closing the open top of the rectangular box and consists of a narrow top lid that is fitted over a wide lower lid. The wide lower lid is formed as a rectangle with equal height parallel long side walls with parallel short end walls with a flat bottom panel fitted thereacross, forming an open center area. The top lid edge is hinge connected, as with a piano type hinge, or the like, to the top edge of the lower lid long side wall, the top lid to pivot back towards the pickup truck cab, providing access to the lower lid interior. The lower lid, in turn, is hinge connected, preferably utilizing a roller type hinge, or the like, to a top edge of the box long wall, immediately below and juxtaposition to, the top lid hinge, which lid roller hinge connection provides for displacing the lid away from the truck cab as it is pivoted to an open attitude. The lower lid forward displacement allows it to be swung fully off of the box open area without interfering with the front wall of the pickup truck bed or the back of the pickup truck cab.

The storage box end wing portions and the ends of the double lid stack, preferably extend beyond the box ends, across the truck sides. The top lid and lower lid each include a separate arrangement lock for individually securing, respectively, the top lid to the lower lid, and the lower lid to the box. The lower lid to maintain within it, items, such as guns, tools, or the like, and may include one or more layers of cushioning material fitted therein where holes may be cut to accommodate an item or items stored therein. Each top lid and lower lid may also include a light or lights with switches for illuminating items contained, respectively, in the lower lid and box.

BRIEF DESCRIPTION OF THE DRAWINGS

These and other object and features of the invention will become more apparent from the following description in which the invention is described in detail in conjunction with the accompanying drawings.

DETAILED DESCRIPTION

Figure 5:
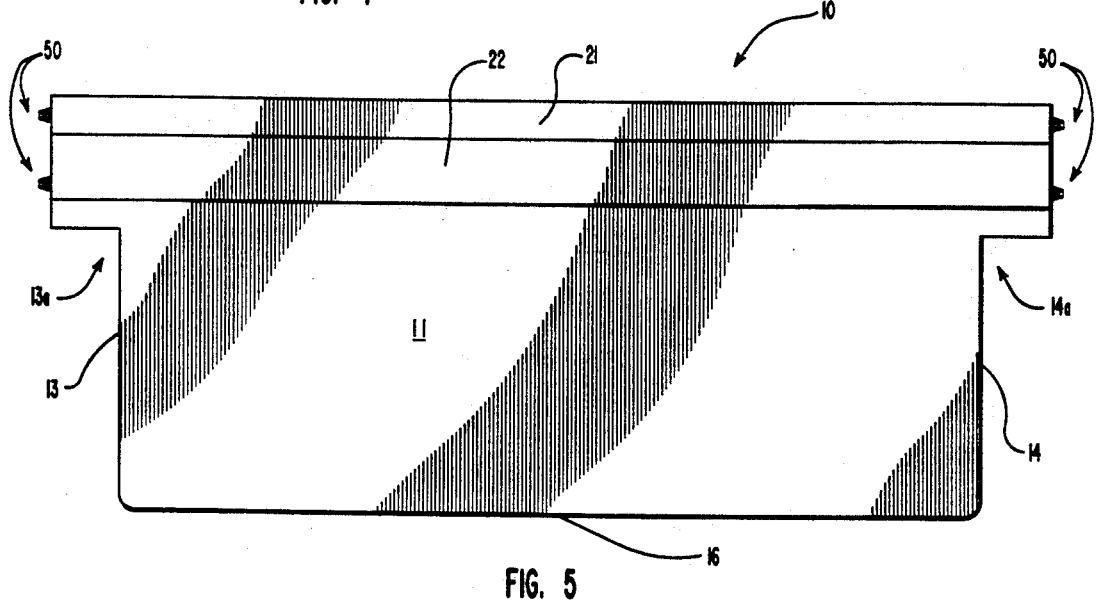
FIG. 5 is a front elevation view of the double lid truck storage box of FIG. 1 only showing the top lid as having been closed and locked over the lower lid.
Figure 6:
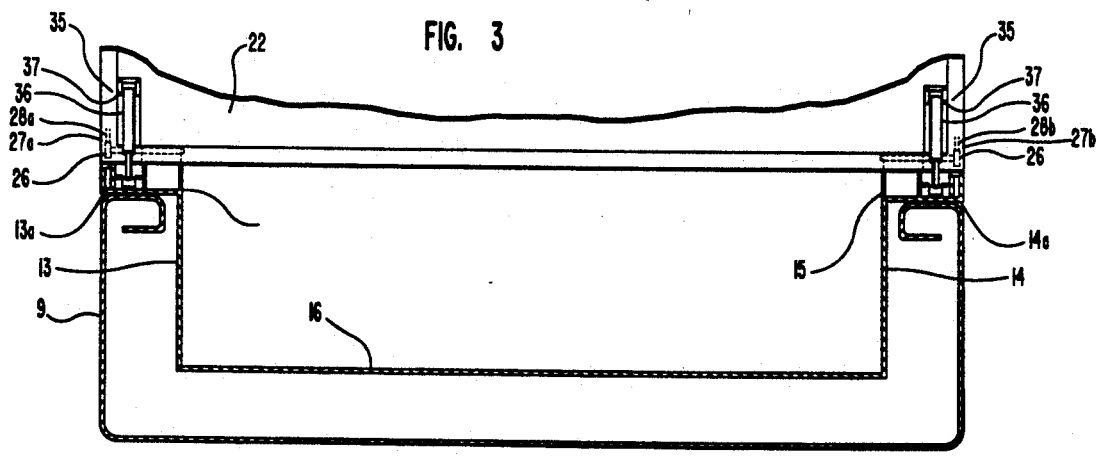
FIG. 6 is an end sectional view taken along the line 6—6 of FIG. 3.

A double lid truck storage box 10 of the invention is shown best in FIGS. 1, 3, 4 and 5, and is hereinafter referred to as box. Box 10 is preferably formed of a heavy durable material such as steel and is for fitting in a forward end of a pickup truck bed 9, as shown in FIG. 6. To fit in which pickup truck bed, the box 10 preferably has essentially a rectangular shape with long front and rear sides 11 and 12, respectively, and short left and right ends 13 and 14, respectively, with a flat bottom 16. The box short ends 13 and 14 are each stepped outwardly across a point 15 above the middle, and then upwardly, to align with the box top edges, forming, as shown best in FIG. 6, wing sections 13a and 14a. As shown the wing sections 13a and 14a extend over the tops of the pickup truck bed 9 sides, the wing section end opposite faces aligning with the truck sides. The box 10 may be empty or, as shown best in FIG. 3, may include a tray 17, or trays with out-turned lip edges 18 for fitting over the top edges of the front and rear sides 11 and 12, supporting the tray above the box bottom 16.

Figure 7:
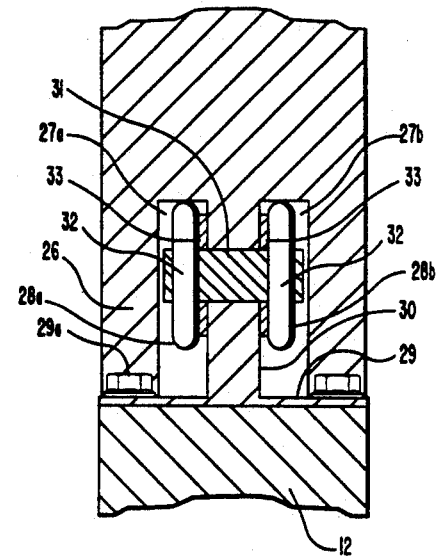
FIG. 7 is an enlarged sectional view taken within the line 7—7 of FIG. 6, showing one of the pair of roller hinges mounted to the storage box top edge and supported in a track mounted in the lid.
Figure 3:
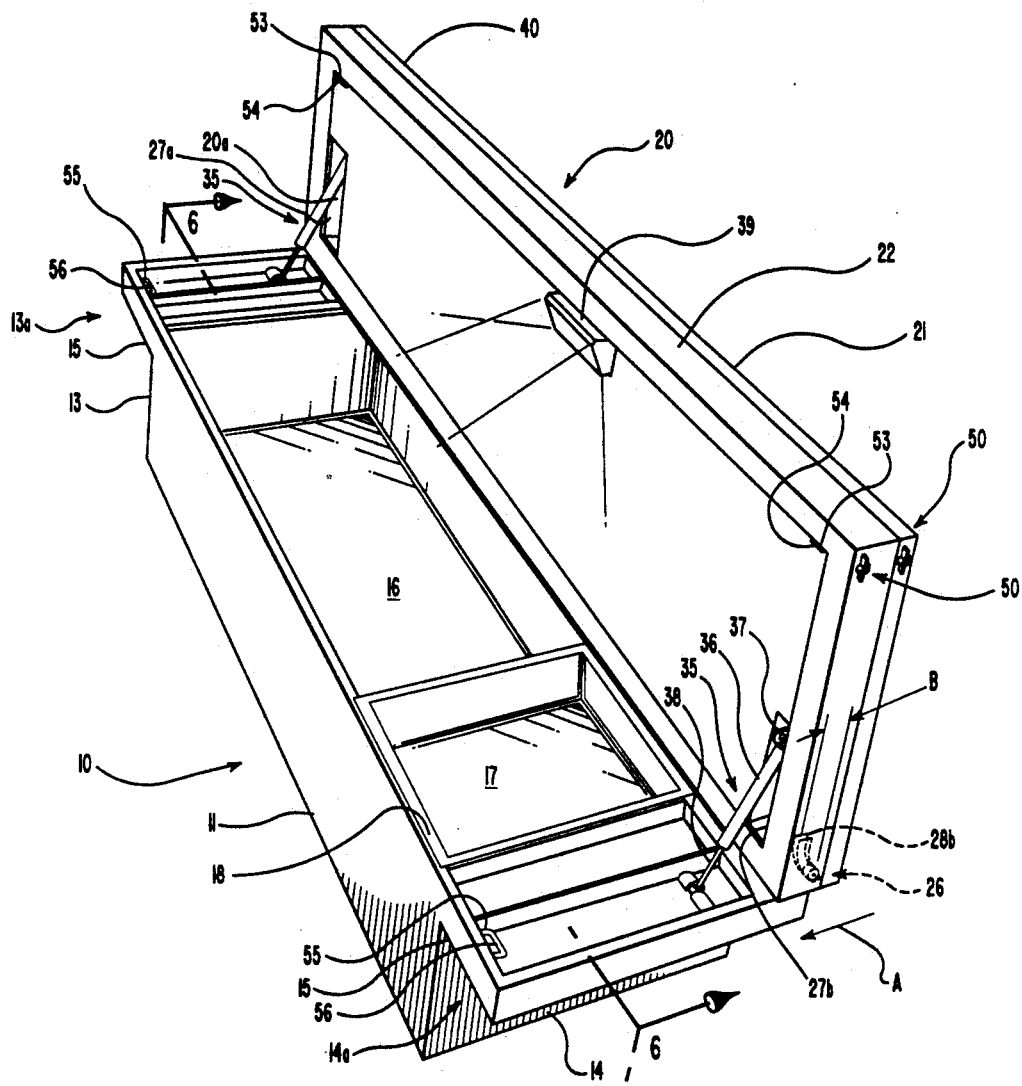
FIG. 3 is a view like FIG. 1 except showing the top lid locked to the lower lid that has been pivoted around a roller hinge coupling to the box, showing the box interior with a tray fitted therein.

The box 10 open top area is covered over by a double lid 20 of the invention. The double lid 20 includes a top lid 21 and lower lid 22. Shown in broken lines in FIG. 4, the top lid 21 lower edge of a rear side 23 is connected at hinge 24, to an upper edge of lower lid 22 rear side 25 that is shown herein as a piano type hinge. Though, it should be understood, other types of hinges could also be utilized as described within the scope of this disclosure. The lower lid 22 rear side 25, along its lower edge, is, in turn, connected by a pair of identical roller hinges 26 to a box rear side 12 top edge. Which roller hinges 26, as shown best in FIGS. 3 and 7, are each positioned in a lid compartment 27a and 27b, respectively, rollers 32 thereof arranged in arcuate tracks 28a and 28b, lower respectively, shown also in broken lines in FIGS. 1, 3 and 6. The lid 22 of the invention is of a height for providing a storage area therein suitable for storing narrow items, and, accordingly, the pair of roller hinges 26 are provided for displacing the lower lid towards the box front side 12 when it is lifted around its hinge mount to the box rear side 11 top edge. Which lower lid displacement moves the lid rear side 11 and hinge connected top lid rear side 23 away from the truck bed forward end and truck cab allowing the lower lid 22 and top lid 21 to be pivoted to a fully opened attitude, moving as illustrated by arrow A in FIG. 3.

The roller hinges 26, as shown best in FIG. 7, includes a base plate 29 that is rigidly secured by bolt type fasteners 29a to extend at right angle upwardly from the box rear side 11 top edge and mounts, at a right angle, a standard 30 that extends upwardly from the base plate center. The standard 30, in turn, mounts an axle 31 secured across its top end, the standard and axle forming a cross. The axle 31 mounts, to each end, a roller 32 journaled thereon. The pair of rollers 32 are journaled in side by side relationship, and each is contained between a backing plate 33, and a washer with a cotter pin, not shown, fitted across an axle end. Though, it should be understood, one roller 32 could be mounted to an end of an axle 31 that extends across standard 30, within the scope of this disclosure.

Figure 1:
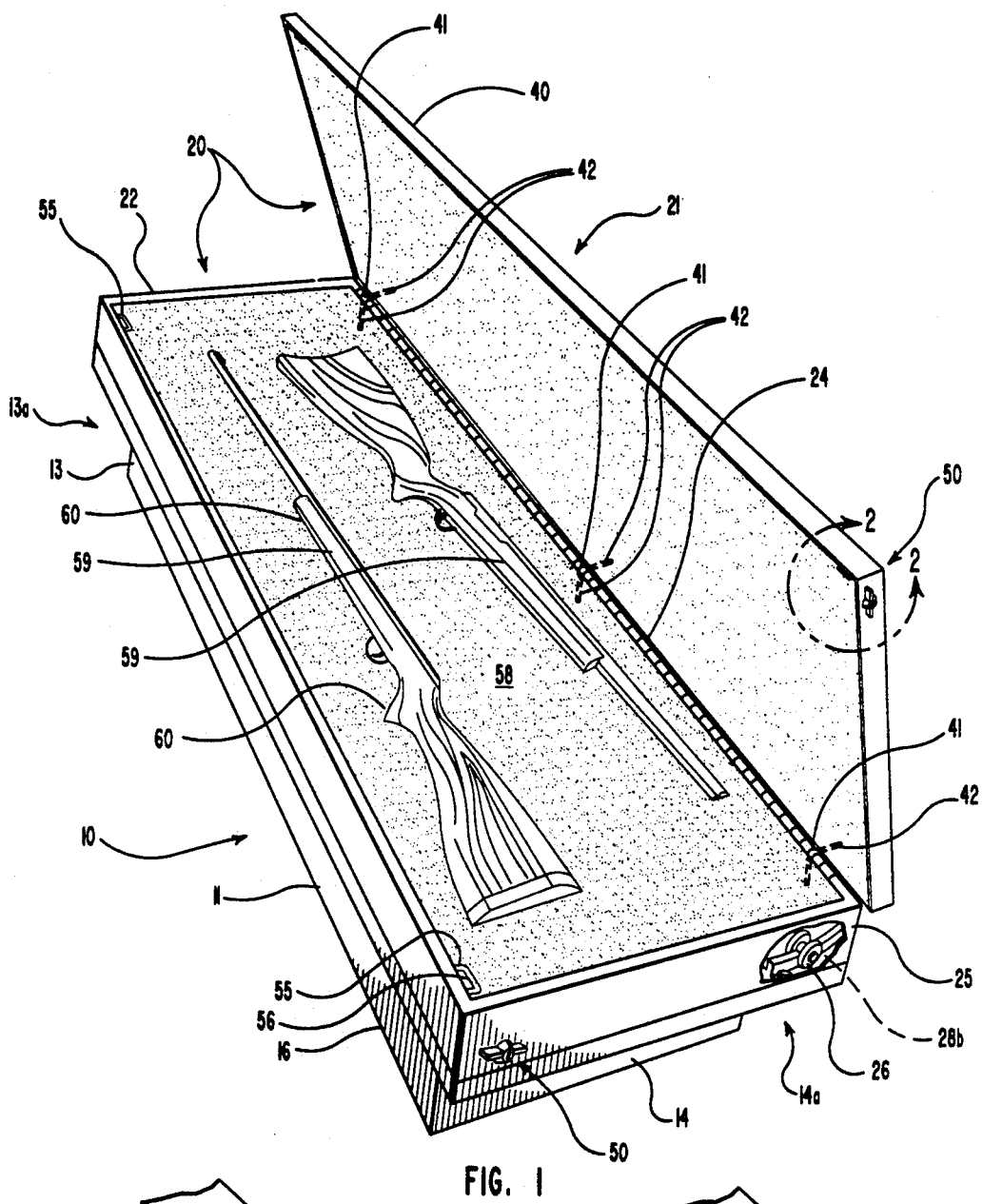
FIG. 1 is a profile perspective view taken from the right side of the double lid truck storage box of the invention showing a top lid pivoted around a hinge coupling to a lower lid, and showing the lower lid as containing a cushioning material wherein holes have been formed that are silhouettes of two rifles, with rifles shown fitted into which holes.
Figure 4:
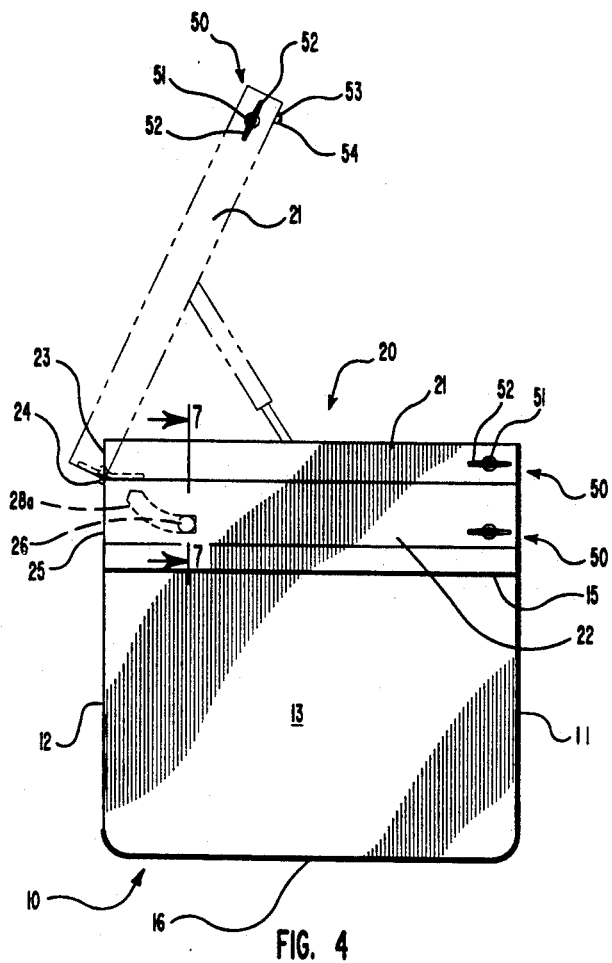
FIG. 4 is a left side elevation view of the double lid truck storage box of FIG. 1, only showing the open top lid in broken lines.

The side by side rollers 32 are maintained, in pairs of arcuate tracks 28a and 28b, respectively, the curve of which arcuate tracks is illustrated in broken lines in FIGS. 1, 3 and 4. The arcuate tracks 28a and 28b provide surfaces for the pair of rollers 32 to travel on during lid lifting, and are open centrally to allow for passage of the standard 30 therealong. When the lid 22 is in a closed attitude, covering the box 10 open top, each roller hinge 26, as shown best in FIG. 4, is positioned at a forward end of the arcuate tracks 28a and 28b. Whereas, when the lid 22 has been pivoted off of the box 10 top area, as shown best in FIG. 3, the roller hinge 26 will have moved to a rear end of the arcuate tracks 28a and 28b. The lid 22 is thereby displaced forward, as illustrate by arrow A in FIG. 3. The spacing distance between the roller 32 axles at their limits of travel in the arcuate tracks 28a and 28b is the distance that the lid is displaced forward.

For supporting the lower lid 22 in its open attitude, as shown best in FIG. 3, at least one ram 35, but preferable a pair, are fitted between the lower lid under surface and box, one each adjacent to each lower lid end. Shown in FIG. 3, each ram 35 is connected between the lower lid compartments 27a and 27b, and the box wing sections 13a and 14a, respectively. Each ram 35 includes an actuator housing 36 that is pivotally connected on a top end 37 into the lower lid compartment 27a or 27b, and includes an actuator rod 38 extending outwardly from the actuator other end. The actuator rod 38, in turn, is pivotally connected across the floor of the wing sections 13a or 14a. Each ram 35 is preferably pneumatic though, it should be understood, it could by hydraulic, and is arranged to provide a resistance to the actuator rod 38 travel as it is pulled out of the actuator body 36 as the lower lid 22 is lifted. Each ram 35 is for supporting the lower lid in its elevated attitude, as shown in FIG. 3. Preferably, the lower lid 22 includes a light 39 mounted therein that is connected electrically to the vehicle battery or to a separate battery, to be turned on manually, or when the lid is lifted to the attitude shown in FIG. 3.

The top lid 21, as set out above and as shown best in FIG. 1, is connected at hinge 24, that is preferably a piano type hinge, to the lower lid 22 rear side 23 upper edge, juxtaposition to the lower lid roller hinge 26 connection to box 10. The top lid 21 opening is thereby independent of the lower lid 22 and is opened by release of a lock, as set out hereinbelow, and the lifting of a top edge of a lid forward side 40. To assist in top lid 21 lifting and for supporting which top lid in its lifted attitude, as shown in FIG. 1, sear springs 41 are preferably fitted, at spaced intervals, along the hinge 24. The sear springs 41 are arranged such that sear spring legs 42 are relaxed when the top lid 21 is in an erected attitude, as shown in FIG. 1 and in broken lines in FIG. 4. Which sear spring legs 42 are moved to be essentially in alignment with one another, loading each sear spring 41, as the top lid is closed, as illustrated in FIGS. 3, 4 and 5. Upon release of a top lid lock, as described below, the sear spring legs tend to 42 move apart, assisting in lifting the top lid 21 off from lower lid 22. Further, spear springs 41 tend also to maintain the top lid in its lifted attitude, until an operator applies a force to lower that top lid into covering attitude over the lower lid 22 top open area.

Figure 2A:
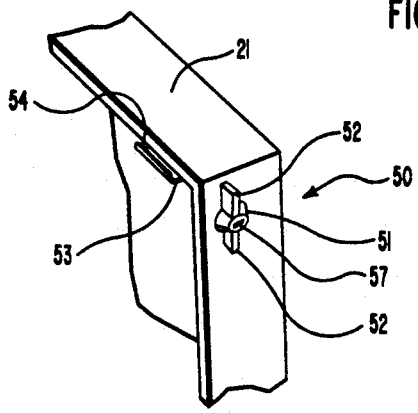
FIG. 2A is an expanded sectional view taken within the line 2—2 of FIG. 1, showing a top lid lock in a locked attitude.
Figure 2B:
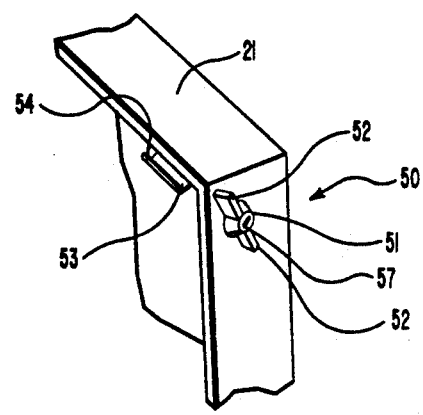
FIG. 2B is a view like FIG. 2A only showing the top lid lock in an unlocked attitude.

Lock arrangements are preferably provided for separately locking the top lid 21 to the lower lid 22 and the lower lid 22 to the box 10, respectively. A hook lock 50 is shown in FIGS. 1, 2A and 2B, as a preferred lock arrangement for both top and lower lids of the invention. Though, it should be understood, a number of locks, such as a vending machine type lock, or a movable bar arrangement where a bar end is moved by operation of the lock tumbler cylinder under a lip or tab, could be used within the scope of this disclosure. Hook lock 50, as shown best in FIGS. 2A and 2B, includes a spindle 51 that is mounted to and extends outwardly from opposite lid ends. Each spindle 51 includes a pair of oppositely extending wings 52 for gripping by an operator to turn the spindle and a pivotally connected bar 53. The bar 53 is shown as a section of a sheet stock material with a hook end 54 formed across a leading edge. Which bar hook end 54 is for fitting into and locking to a bar 56 of a latch bar 55, shown in FIG. 1, that extends inwardly from the lower lid 22 forward side, for securing the top lid 21 onto the lower lid 22 Turning the spindle 51 through approximately one eighth of a turn, as shown in FIG. 2B pivots the bar 53 from a parallel attitude, shown in FIG. 2A, relative to the plane of the top lid 21 front face, displacing the bar hook end 54 out of engagement with the hook end 56 of the latch bar 55, releasing the top lid 21 from the lower lid 22. Locking of which spindle bar hook end 54 to the bar 56 is, of course, a reverse of the above. Spindle 51 turning is provided by turning the spindle wings 52 by an operator, not shown, who turns the spindle 51 back to the attitude shown in FIG. 2A to lock the top lid 21 onto the lower lid 22. For locking the spindle 51 in place a keyway 57, that is shown best in FIGS. 2A and 2B, is provided for receiving a key, not shown, that is fitted therein for turning to enable or disable spindle 51 turning, thereby controlling access into which lower lid 22 and/or box 10.

The same lock 50 for interaction with latch bar 55, as shown herein, is preferably utilized for locking the top lid 21 to the lower lid 22 and lock the lower lid 22 to box 10. It should, however, be understood that different arrangements of locks could be so used within the scope of this disclosure.

As set out above, the lower lid 22 is formed to have an open internal area for storing items therein. For supporting and protecting such stored items, FIG. 1 shows the lid 22 open area as optionally containing a sheet of a cushioning material 58 that are shown supporting two rifles 59 nested therein. Which cushioning material 58 is shown as having silhouette type openings of each rifle 59 cut therein, and the cut sections removed for receiving each of the rifles 59, within the scope of this disclosure. Of course, the lid could be arranged to contain items other than rifles 59. For example, a pistol or pistols, hand tools, or the like, not shown, could be stored in lower lid 22 with the silhouettes of such item or items cut into the cushioning material 58, or the cushioning material dispensed within the scope of this disclosure.

Herein has been set out a preferred embodiment of my invention in a double lid truck storage box. It should, however, be understood that the present disclosure is made by way of example only and that variations to the invention are possible without departing from the subject matter coming within the scope of the following claims, and a reasonable equivalency thereof, which claims I regard as my invention.

I claim:

1. A double lid truck storage box comprising, a rectangular box for fitting in a pickup truck bed having sidewalls, said rectangular box including a bottom with upstanding front, rear and side walls and an open top wherein said rectangular box is formed to fit across the pickup truck bed and said rectangular box having a pair of wing sections projecting from opposite ends of said rectangular box being adapted to extend across top edges of said pickup truck bed side walls; a double lid having a top lid and a lower lid for fitting over said open top, said top lid for closing over said lower lid, said lower lid having a narrow rectangular shape with a flat bottom and upstanding front, rear and side walls and an open top; hinge means for pivotally connecting said top lid and said lower lid along a far edge of top lid and a top edge of said lower lid rear wall; a second hinge means for pivotally connecting a lower edge of said lower lid to a top edge of said rectangular box rear wall; and a pair of lock means for individually locking said top lid to cover over said lower lid and said lower to bed cover over said rectangular box.

2. A double lid truck storage box as recited in claim 1, wherein the pair of lock means includes a pair of individual locks wherein one of said pair of locks is provided for locking the top lid onto the lower lid and the other of said pair of locks is provided for locking the lower lid onto the rectangular box.

3. A double lid truck storage box as recited in claim 2, wherein said one of said pair of locks includes a spindle for fitting into a side of said top lid with means for manually turning said spindle; bar means connected at one end to said spindle for pivoting around said spindle as it is turned, moving a hook end of said bar means into or out of engagement with a latch means mounted on said lower lid; latch means connected to; and releasable lock means for prohibiting spindle turning until said releasable lock means is released, and said other of said pair of locks includes a second spindle for fitting into a side of said box with means for manually turning said second spindle, a second bar means connected at one end of said second spindle for pivoting around said second spindle as it is turned, moving a hook end of said second bar means into or out of engagement with a second latch means mounted on said box, and a second releasable lock means for prohibiting second spindle turning until said second releasable lock means is released.

4. A double lid truck storage box as recited in claim 1, wherein the hinge means for connecting the top lid onto the lower lid is a hinge which extends along said top edge and said rear edge; and said hinge means further includes a plurality of sear springs mounted at intervals along said hinge, legs of each of said sear springs engaging, respectively, the top lid and lower lid rear walls, such that said sear spring is relaxed when said top lid is in an open position, and said sear spring legs are compressed towards one another, providing spring loading, when said top lid is closed over said lower lid.

5. A double lid truck storage box as recited in claim 1, wherein the second hinge means for connecting the lower lid lower edge to the top edge of rectangular box rear wall is a roller hinge that includes a straight shaft with a means on one straight shaft end for rigidly mounting, at a right angle, to a top edge of the rectangular box rear wall, with said straight shaft opposite end formed into an axle that is at a right angle to said straight shaft and is arranged to receive a roller journaled thereon; said arcuate track means formed in the lower lid for receiving said roller arranged therein, said arcuate track means to travel over said roller displacing said lower lid forward from said rectangular box rear wall when said lower lid is lifted off said rectangular box.

6. A double lid truck storage box as recited in claim 5, wherein said straight shaft opposite end mounts a straight axle thereacross with a pair of rollers each journaled onto an axle end; and said arcuate track is arranged to support both of said rollers and is centrally open to allow for passage of said straight shaft as said arcuate track is moved over said rollers.

7. A double lid truck storage box as recited in claim 1, further including, a cushioning material lining the lower lid with and at least one silhouette cut in said cushioning material adapted to receive an item to be stored in said lower lid.

8. A double lid truck storage box as recited in claim 1, further including, at least one means mounted to extend between the lower lid and rectangular box for supporting said lower lid when said lid is pivoted off of said box.

9. A double lid truck storage box as recited in claim 8, wherein the means for supporting includes a pair of actuators, each mounted between ends of the lower lid adjacent to said lower lid rear wall and the rectangular box, each consisting of a cylindrical actuator body that is pivotally connected at one end to said lower lid and includes an actuator rod projecting outwardly from an opposite end of said actuator rod, which said actuator rod has an end that is fitted to travel up and down within said actuator body that includes a piston means arranged thereacross that is in close contact with an interior wall of said actuator housing, and said actuator rod opposite end is pivotally connected to said rectangular box; and said actuator body is sealed such that actuator rod piston travel is opposed by a fluid maintained in said actuator body.

10. A double lid truck storage box as recited in claim 1, further including, a light maintained is said lower lid.

11. A double lid truck storage box as recited in claim 1, further including, at least one tray arranged to be supported in the rectangular box.

* * * * *